United States Patent
Takanabe et al.

(10) Patent No.: US 9,579,639 B2
(45) Date of Patent: Feb. 28, 2017

(54) TETHERED TRANSITION METALS PROMOTED PHOTOCATALYTIC SYSTEM FOR EFFICIENT HYDROGEN EVOLUTIONS

(71) Applicants: King Abdullah University of Science and Technology, Thuwal (SA); Saudi Arabian Oil Company, Dhahran (SA)

(72) Inventors: Kazuhiro Takanabe, Thuwal (SA); Tayirjan Isimjan, Thuwal (SA); Weili Yu, Thuwal (SA); Silvano Del Gobbo, Thuwal (SA); Wei Xu, Dhahran (SA)

(73) Assignees: SAUDI ARABIAN OIL COMPANY, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 26 days.

(21) Appl. No.: 14/477,414

(22) Filed: Sep. 4, 2014

(65) Prior Publication Data
US 2015/0064105 A1 Mar. 5, 2015

Related U.S. Application Data

(60) Provisional application No. 61/874,063, filed on Sep. 5, 2013.

(51) Int. Cl.
*B01J 31/22* (2006.01)
*C01B 3/06* (2006.01)
(Continued)

(52) U.S. Cl.
CPC ............ *B01J 31/226* (2013.01); *B01J 23/06* (2013.01); *B01J 23/755* (2013.01); *B01J 27/043* (2013.01);
(Continued)

(58) Field of Classification Search
CPC ...... B01J 35/004; B01J 27/138; B01J 35/002; Y02E 60/364
See application file for complete search history.

(56) References Cited

U.S. PATENT DOCUMENTS 3,782,978 A * 1/1974 Souza ................ C23C 18/36
106/1.27
6,447,650 B1 * 9/2002 Park ................ B01J 27/138
204/157.52

FOREIGN PATENT DOCUMENTS

| CN | 101293632 | 10/2008 |
| WO | WO 0078450 | 12/2000 |

OTHER PUBLICATIONS

Subramanian et al. "Catalysis with TiO2/Gold Nanocomposites. Effect of Metal Particle Size on the Fermi Level Equilibration", 2004, J. Am. Chem. Soc. 9 vol. 126, No. 15, 2004 4945.*

(Continued)

*Primary Examiner* — Stanley Silverman
*Assistant Examiner* — Syed Iqbal
(74) *Attorney, Agent, or Firm* — Leason Ellis LLP

(57) ABSTRACT

The present invention is directed, at least in part, to a process for improving the efficiency of a photocatalyst (a semiconductor photocatalyst) by tethering (depositing) a metal (e.g., metal ions of a late transition metal, such as nickel) to the semiconductor (photocatalyst) surface through the use of an organic ligand. More specifically, 1,2-ethanedithiol (EDT) functions as an excellent molecular linker (organic ligand) to attach a transition metal complex (e.g., nickel ($Ni^{2+}$ ions)) to the semiconductor surface, which can be in the form of a cadmium sulfide surface. The photocatalyst has particular utility in generating hydrogen from $H_2S$.

14 Claims, 2 Drawing Sheets

Conceptual scheme of CdS surface modification with ethanedithiol-nickel species.

(51) Int. Cl.
B01J 37/03 (2006.01)
B01J 37/04 (2006.01)
B01J 23/06 (2006.01)
B01J 23/755 (2006.01)
B01J 27/043 (2006.01)
B01J 35/00 (2006.01)

(52) U.S. Cl.
CPC ....... *B01J 31/2273* (2013.01); *B01J 31/2278* (2013.01); *B01J 35/004* (2013.01); *B01J 37/038* (2013.01); *B01J 37/04* (2013.01); *C01B 3/065* (2013.01); *B01J 2531/847* (2013.01); *Y02E 60/36* (2013.01)

(56) References Cited

OTHER PUBLICATIONS

Jin-Ook Baeg: "A novel nanoscale semiconductor photocatalyst for solar hydrogen production", SPIE Newsroom, Jan. 1, 2008 (Jan. 1, 2008), XP055151562, DOI: 10.1117/2.1200810.1328, p. 1, left-hand column, paragraph third, p. 1, right-hand column, line first, figures 1, 3.
K. Takanabe, K. Domen, "Toward Visible Light Response: Overall Water Splitting Using Heterogeneous Photocatalysts", Green (2011), vol. 1, pp. 313-322.
K. Takanabe, K. Domen, "Preparation of Inorganic Photocatalytic Materials for Overall Water Splitting" ChemCatChem, 2012, 4, 1485-1497.
A.T. Garcia-Esparza, D. Cha, Y. Ou, J. Kubota, K. Domen, K. Takanabe, "Tungsten Carbide Nanoparticles as Efficient Cocatalysts for Photocatalytic Overall Water Splitting", ChemSusChem, 2013, 6, 168-181.
Nosaka, Yoshio et al., "Separation Mechanism of a Photoinduced Electron-Hole Pair in Metal-Loaded Semiconductor Powders", Ber. Bunsenges. Phys. Chem. 1986, 90, 1199-1204.
M. Matsumura, Y. Saho, H. Tsubomura, "Photocatalytic Hydrogen Production from Solutions of Sulfite Using Platinized Cadmium Sulfide Powder", J. Phys. Chem. 1983, 87, 3807-3808.
M. Matsumura, T. Uchihara, K. Hanafusa, H. Tsubomura, "Interfacial Band Structure of Platinum-Loaded CdS Powder and Its Correlation with the Photocatalytic Activity", J. Electrochem. Soc., 1989, 136, 1704-1709.
K. Ogisu, K. Takanabe, D. Lu, M. Saruyama, T. Ikeda, M. Kanehara, T. Teranishi, K. Domen, "CdS Nanoparticles Exhibiting Quantum Size Effect by Dispersion on $TiO_2$: Photocatalytic $H_2$ Evolution and Photoelectrochemical Measurements" Bull. Chem. Soc. Jpn. 2009, 82, 528-535.
H. Yan, J. Yang, G. Ma, G. Wu, X. Zong, Z. Lei, J. Shi, C. Li, "Visible-light-driven hydrogen production with extremely high quantum efficiency on Pt—PdS/CdS photocatalyst", J. Catal., 2009, 266, 165-168.
P. Shen, S. Zhao, D. Su, Y. Li, A. Orlev, "Outstanding activity of sub-nm Au clusters for photocatalytic hydrogen Production", Appl. Catal. B, 2012, 126, 153-160.
X. Zong, H. Yan, G. Wu, G. Ma, F. Wen, L Wang, C. Li, "Enhancement of Photocatalytic $H_2$ Evolution on CdS by Loading $MoS_2$ as Cocatalyst under Visible Light Irradiation", 2008, 130, 7176-7177.

J.-F. Reber, M. Rusek, "Photochemical Hydrogen Production with Platinized Suspensions of Cadmium Sulfide and Cadmium Zinc Sulfide Modified by Silver Sulfide", J. Phys. Chem. 1986, 90, 824-834.
K. Domen, S. Naito, M. Soma, T. Onishi, K. Tamaru, "Photocatalytic Decomposition of Water Vapour on an NO-$SrTiO_3$, Catalyst", J. Chem. Soc. Chem. Comm. 1980, 543-544.
K. Domen, A. Kudo, T. Onishi, N. Kosugi, H. Kuroda, "Photocatalytic Decomposition of Water into $H_2$ and $O_2$, over NiO—$SrTiO_3$, Powder. 1. Structure of the Catalyst", J. Phys. Chem. 1986, 90, 292-295.
K. Domen, A. Kudo, T. Onishi, "Mechanism of Photocatalytic Decomposition of Water into $H_2$ and $O_2$ over NiO—$SrTiO_3$", J. Catal. 1986, 102, 92-98.
T.K. Townsend, N.D. Browning, F. E. Osterloh, "Overall photocatalytic water splitting with $NiO_x$—$SrTiO_3$—a revised Mechanism", Energy Environ. Sci., 2012, 5, 9543-9550.
J. Ran, J. Yu, M. Jaroniec, "$Ni(OH)_2$ modified CdS nanorods for highly efficient visible-light-driven photocatalytic $H_2$ generation", Green Chem. 2011, 13, 2708-2713.
Z. Han, F. Qiu, R. Eisenberg, P.L. Holland, T.D. Krauss, "Robust Photogeneration of H2 in Water Using Semiconductor Nanocrystals and a Nickel Catalyst", Science, 2012, 338, 1321-1324.
Z. Han, W.R. McNamara, M.-S. Eum, P.L. Holland, R. Esennberg, "A Nickel Thiolate Catalyst for the Long-Lived Photocatalytic Production of Hydrogen in a Noble-Metal-Free System", Angew. Chem. Int. Ed. 2012, 51, 1667-1670.
W. Zhang, J. Hong, J. Zheng, Z. Huang, J. Zhou, R. Xu, "Nickel—Thiolate Complex Catalyst Assembled in One Step in Water for Solar $H_2$ Production". J. Am. Chem. Soc., 2011, 133, 20680-20683.
D.L. Leussing, G.S. Alberts, "The Reactions of Nickel(II) with 1,2-Ethanedithiol", J. Am. Chem. Soc., Mar. 7, 1960, 82, 4458-4461.
K. Takanabe, K. Aika, K. Seshan, L. Lefferts, "Sustainable hydrogen from bio-oil—Steam reforming of acetic acid as a model oxygenate" 2004, 227, 101-108.
J.M. Luther, M. Law, Q. Song, C.L. Perkins, M.C. Beard, A.J. Nozik, "Structural, Optical, and Electrical Properties of Self-Assembled Films of PbSe Nanocrystals Treated with 1,2-Ethanedithiol", ACS Nano, 2008, 2, 271-280.
W. Tremel, M. Kriege, B. Krebs, G. Henkel, "Nickel—Thiolate Chemistry Based on Chelating Ligands: Controlling the Course of Self-Assembly Reactions via Ligand Bite Distances. Synthesis, Structures, and Properties of the Homoleptic Complexes $[Ni_3(SCH_2C_6H_4CH_2S)_4]^{2-}$, $[Ni_3(SCH_2CH_2S)_4]^{2-}$, and $[Ni_6(SCH_2CH_2CH_2S)_7]^{2-}$", Inorg. Chem. 1988, 27, 3886-3895.
Jin-Ook Baeg: "A novel nanoscale semiconductor photocatalyst for solar hydrogen production", SPIE Newsroom, Jan. 1, 2008 (Jan 1, 2008), XP055151562, DOI: 10.1117/2.1200810.1328, p. 1, left-hand column, paragraph third, p. 1, right-hand column, line first, figures 1, 3.
Shen Y.-J et al, "Assembly of Cds quantum dots onto mesoscopic $TiO_2$ films for quantum dotsensitized solar cell applications". Nanotechnology, Jan. 4, 2008, vol. 19, No. 4, pp. 045602 Figure 1, Experimental section.
Robel I. et al, "Quantum dot solar cells. Harvesting light energy with CdSe nanocrystals molecularly linked to mesoscopic $TiO_2$ films". J. Am. Chem. Soc. 2006, Mar. 2006, vol. 128, No. 7, pp. 2385-2393 Experimental Section.

* cited by examiner

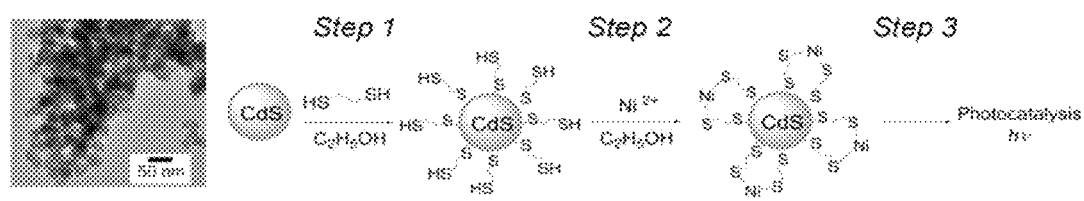
*Fig. 1.* Conceptual scheme of CdS surface modification with ethanedithiol-nickel species.

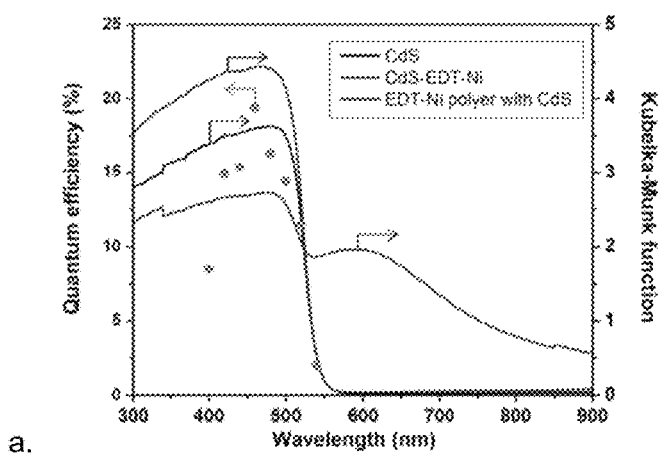
*Fig. 2.* DR UV-VIS spectra of CdS, CdS-EDT-Ni and EDT-Ni polymer with CdS.

TETHERED TRANSITION METALS PROMOTED PHOTOCATALYTIC SYSTEM FOR EFFICIENT HYDROGEN EVOLUTIONS

CROSS-REFERENCE TO RELATED APPLICATIONS

This application is based on and claims priority to U.S. Provisional Patent Application Ser. No. 61/874,063, filed on Sep. 5, 2013, which is hereby incorporated by reference as if set forth in its entirety herein.

TECHNICAL FIELD

The present invention relates to a photocatalyst material (semiconductor photocatalyst) and more specifically, to a process for tethering the photocatalyst surface with a metal (e.g., nickel ions or other transition metal ions) by a linker (organic ligand) to improve the performance of the photocatalyst, thereby providing improved photocatalytic systems for efficient hydrogen evolutions as well as other for use in other photocatalytic applications.

BACKGROUND

Natural gas operations and hydrodesulfurization processes at refineries produce large quantities of hydrogen sulfide ($H_2S$). Some sour gas wells can contain greater than 30% of $H_2S$. $H_2S$ is corrosive in nature and impedes the integrity of pipeline. $H_2S$ induces hydrate formation and impacts gas production. $H_2S$ is toxic, environmental harmful and therefore, it must be neutralized.

In the step of desulfurizing crude oil which is generally conducted presently, heavy naphtha is subjected to hydrofining during crude oil distillation to recover all of the sulfur ingredients contained in the crude oil as hydrogen sulfide. Currently, the predominant process for converting $H_2S$ into non-toxic elemental sulfur is the Claus sulphur recovery process. The Claus process includes a number of different steps that are performed to neutralize the toxic $H_2S$. First, the $H_2S$ is separated from the host gas stream using amine extraction. Then, the $H_2S$ is fed to a Claus unit, where it is converted in the following two steps. The first step is a thermal step in which the $H_2S$ is partially oxidized with air. This is done in a reaction furnace at high temperatures (1000-1400° C.). Sulfur is formed, but some $H_2S$ remains unreacted, and some $SO_2$ is made. The second step is a catalytic step in which the remaining $H_2S$ is reacted with the $SO_2$ at lower temperatures (about 200-350° C.) over a catalyst to make more sulfur. A catalyst is needed in the second step to help the components react with reasonable speed. Unfortunately, the reaction does not go to completion even with an optimal catalyst. For this reason, two or three stages are used, with sulfur being removed between the stages. Inevitably, a small amount of $H_2S$ remains in the tail gas and this residual quantity, together with other trace sulfur compounds, is usually dealt with in a tail gas unit.

While the Claus process can yield high conversion rates, there are a number of deficiencies associated with this sulfur recovery process. In particular, the Claus process necessitates an enormous amount of energy because of not only the catalytic reaction of sulfurous acid gas with hydrogen sulfide but also repetitions of heating and condensation. The process has further problems, for example, that the management of sulfurous acid gas is costly. In addition, the process cannot recover the energy contents of $H_2S$ and cannot produce highly demanded $H_2$.

Catalysis is the process in which a substance participates in modifying the rate of a chemical transformation of the reactants without being altered or consumed in the end. This substance is known as the catalyst which increases the rate of a reaction by reducing the activation energy. Generally speaking, photocatalysis is a reaction which uses light to activate a substance which modifies the rate of a chemical reaction without being involved itself. The photocatalyst is the substance which can modify the rate of chemical reaction using light irradiation.

A semiconductor photocatalyst has an energy band structure in which the conduction band and the valence band structure are separated by a forbidden band. When a photocatalyst is irradiated with light having energy equal to or higher than a band gap, electrons in the valence band are excited to the conduction band, while holes are generated in the valence band. The electrons excited to the conduction band have higher reducing power than that when the electrons are present in the valence band, and the holes have higher oxidizing power.

Thus, photocatalysis can be in the form of a process that involves light absorption by a semiconductor, particularly, in the form of particulates and generation of excitons to be separated to make redox reactions. The process allows the free-energy positive reaction (a thermodynamically unfavored reaction) to happen utilizing photon energy incident to a reactor (device), which can be utilized for solar energy conversion to chemical energy.

Photocatalytic evolution (generation) of hydrogen using semiconductor powder materials has gained considerable attention because of the importance of solar energy conversion or recovering energy from waste, such as biomass-related organic wastes and hydrogen sulfide. Utilizing solar energy for photocatalysis requires not only extensive absorption in visible light range but also large scale application with low capital cost. The earth-abundant elements are therefore preferred to be the components of the photocatalyst materials. Noble metal nanoparticles are generally good electrocatalyst materials to reduce water/proton to generate hydrogen molecules, and thus efficient photocatalysts can include noble metal nanoparticles on the surface of semiconductor materials. Finding the alternative of noble metals possessing high electrocatalytic activity is still awaited and is desirable.

For high efficient conversion of photocatalytic water splitting, modification of the photocatalyst surface with a cocatalyst is essential because of enhancement in the charge separation creating new metal-semiconductor electronic structure, and in electrocatalytic properties that catalyze the target redox reactions. Many nanomaterials decorated (deposited) on the photocatalyst material, such as Pt, Pt—Pd (S), Au, $MoS_2$, and $Ag_2S$ have been reported to enhance photocatalytic hydrogen evolution. For many years, a nickel-based nanoparticle structure is known to be active for photocatalytic water splitting reaction and a moderate size (typically greater than 10 nm) of metallic nickel particles has been considered to be utilized for an active site of hydrogen evolution. A more recent study reported that nickel-thiolate complexes possibly work effectively as hydrogen evolution sites.

Despite these advances, there is still a need for improvements in solar-based hydrogen production technologies and in particular, there is a need for an improved alternative process for the simultaneous conversion of $H_2S$ or its containing gases into valuable hydrogen and sulfur. In other words, there is a desire and need for a method for decomposing hydrogen sulphide with a photocatalyst to yield hydrogen and sulfur and which can be put to practical use, thereby making it possible to decompose hydrogen sulfide as a harmful substance with a smaller amount of energy to produce hydrogen and sulfur as useful substances.

This is particularly true for industries that are located in areas that have high annual solar irradiation, such as Saudi Arabia.

SUMMARY

The present invention is directed, at least in part, to a process for improving the efficiency of a photocatalyst (semiconductor photocatalyst) by tethering (depositing) a metal (e.g., metal ions of a late transition metal, such as nickel) to the semiconductor (photocatalyst) surface through the use of an organic ligand as described herein. In one or more variations, 1,2-ethanedithiol (EDT) functions as an excellent molecular linker (e.g., organic ligand) to attach a metal complex (e.g., nickel ($Ni^{2+}$ ions)) to the semiconductor surface, which can be in the form of a cadmium sulfide (CdS) surface.

The photocatalyst of the present invention can be used in a number of different applications, including for the generation of hydrogen from $H_2S$, water splitting, $CO_2$ reduction, etc.

BRIEF DESCRIPTION OF THE DRAWING FIGURES

FIG. 1 shows a scheme of CdS surface modification with ethanedithiol-nickel species in accordance with one embodiment of the present invention; and FIG. 2 is a DR UV-VIS spectra of CdS, CdS-EDT-Ni and EDT-Ni polymer with CdS.

DETAILED DESCRIPTION OF CERTAIN EMBODIMENTS

Accordingly, one object of the present invention is to overcome the drawbacks of the related-art techniques described above and provide a photocatalyst which has high catalytic activity, is nontoxic, has a long life, can utilize visible light as it is for photocatalytic reactions, and is useful especially for hydrogen generation. Another object of the present invention is to provide a process for producing the photocatalyst.

As discussed herein, in one intended exemplary application, the photocatalytic system in accordance with the present invention requires the presence of nickel ions dissolved in the solution (homogeneous phase), which changes the oxidation state from $Ni^{2+}$ to $Ni^+$ during the photocatalysis. Therefore, the nickel ion has to remain in the solution, which makes the practical application difficult. One objective of the present invention is thus to provide a process to effectively stabilize these nickel complexes on a surface of a semiconductor photocatalyst material and thereby, substantially improve the photocatalytic performance of the system. The process of the present invention achieves such results by modification of the semiconductor surface as discussed herein.

The present invention is directed, at least in part, to a process for improving the efficiency of a photocatalyst (semiconductor photocatalyst) for production of hydrogen from $H_2S$ by tethering a metal (e.g., metal ions of a late transition metal) to the semiconductor (photocatalyst) surface through the use of an organic ligand as described herein. The application of the process of the present invention to the neutralization of $H_2S$ and the resulting production of hydrogen from the $H_2S$ is understood to be one exemplary application of the photocatalyst. Sulfur is also produced as a result of the conversion of the $H_2S$ using the semiconductor photocatalyst material of the present invention. Thus, it will be appreciated and understood that the present invention has other applications besides production of hydrogen from $H_2S$ and in particular, the teachings of the present invention can be applied to other photocatalytic applications, such as water splitting and $CO_2$ reduction.

Traditionally, the efficiency of photocatalysts was enhanced by direct transition metal doping on surfaces of semiconductors that are suitable for the intended applications. However, there are limitations and deficiencies with such an approach. As set forth herein, one major difference between this traditional process and the process of the present invention is that, in accordance with the present invention, the semiconductor does not have a dopant layer as in the traditional direct doping approach.

Instead of using a conventional metal doping process to enhance the efficiency of the photocatalyst, the present invention is directed to providing improved semiconductor photocatalysts by modifying the semiconductor surfaces at a molecular level. More specifically, a molecular linker (such as an organic ligand) is used to attach metal complexes (e.g., nickel complexes) to the surface of the semiconductor photocatalyst. As mentioned herein, this modification, in the form of a tethered transition metal for example, yields an improved photocatalyst material that is particularly suited for use in the generation of hydrogen from $H_2S$ (however, other applications are equally possible). The process of the present invention avoids charge recombination at catalytic active sites and require much less metal, which is normally expensive, to achieve the same or better conductivity (relative to traditional methods and materials) and hence better efficiencies of photocatalysis.

FIG. 1 illustrates a process for modifying the surface of a semiconductor photocatalyst in accordance with the present invention to improve the performance properties of the photocatalyst material.

Photocatalyst Material

Any number of different semiconductor photocatalyst materials can be used in accordance with the present invention so long as they are suitable for the intended applications. For example, the semiconductor photocatalyst material can comprise one or more sulfides, including but not limited to CdS, $MoS_2$, FeS, CoS, NiS, MnS2, ZnS, $ZnS_2$, $Cu_2S$, Rh2S, $Ag_2S$, HgS, $In_2S_3$, $SnS_2$, PbS, SnS2, PbS, SnS, TiS, and $Sb_2S_3$. In one exemplary embodiment, the semiconductor photocatalyst material is in the form of a cadmium sulfide (CdS) material. As is known, cadmium sulfide is a direct band gap semiconductor that functions as a semiconductor photocatalyst and is often used as a core component of a solar cell, as well as other applications. The CdS material is prepared using conventional techniques including but not limited to synthesizing techniques that produce CdS with high crystallinity (CdS nanocrystals).

In one or more variations, the semiconductor photocatalyst material can also comprise one or more oxides, including but not limited to $TiO_2$, $CoTiO_3$, $NiTiO_3$, $CuTiO_3$, $ZnTiO_3$, $V_2O_5$, $FeO_2$, $FeO_3$, CuO, NiO, $Cu_2O$, ZnO, and $SrTiO_3$. In at least one variation, the semiconductor photocatalyst material can comprise one or more other semiconductor materials, including but not limited to CdSe, ZnSe, PbSe, Ag2Se, CuInS2, CuInGaSe2, ZnS2CdSe.

Molecular Linker/Metal Species

The process involves the use of a molecular linker to attach a metal (e.g., transition metal), such as nickel (a late transition metal) to the surface of the semiconductor photocatalyst material. Other transition metals and related metals suitable for the intended applications of the present invention include but are not limited to Ag, Au, Pb, Ru, Ir, Cu, Fe, Mn, Co, and Pt/Au alloy. The present applicant discovered that 1,2-ethanedithiol (EDT) functions as an excellent molecular linker (organic ligand) to attach a transition metal complex to cadmium sulfide surfaces (surfaces of the semiconductor material). 1,2-ethanedithiol (EDT) is a colorless liquid with the formula $C_2H_4(SH)_2$ and acts as an excellent ligand for metal ions. Other organic ligands (molecular linkers) suitable for the intended applications of the present invention include but are not limited to 2-mercaptopropionic acid, thioglycolic acid, 11-mercaptoundecanoic acid, mercaptosuccinic acid, 1,4 benzenedithiol, 4,4'-dimercaptostilbene, p-phenylenediamine, 4-mercaptobenzoic acid, sodium 2,3-dimercaptopropanesulfonate monohydrate, 1,3,4-thiadiazole-2,5-dithiol, trithiocyanuric acid, biphenyl-4,4-dithiol, and (3-mercaptopropyl)triethoxysilane.

Referring specifically to FIG. 1, after formation of the semiconductor material, in this case synthesized CdS nanocrystals, the semiconductor material is treated in a diluted EDT in ethanol solution. This treatment is for a predetermined amount of time, such as about 6 hours, to ensure saturation of the CdS surface with the EDT species. This treatment is indicated as step 1 in FIG. 1.

As shown in step 2 of FIG. 1, after filtration, the CdS nanocrystals are suspended in a 2 M $Ni^{2+}$ aqueous solution. This solution is agitated, as by stirring, for a predetermined period of time, such as about 6 hours (however, less or more agitation time is possible). It will be understood that the treatment time can vary depending upon the specific application and other operating parameters (thus, the treatment time may be less than 6 hours or more than 6 hours).

Diffuse reflectance Fourier-transformed infrared (DRIFT) spectra indicates the bare CdS surface contains remaining acetate species on the surface from the Cd precursor. For the CdS sample treated with EDT, the signals at 3068, 2968, 2937, 2878 $cm^{-1}$ associated with asymmetric/symmetric CH stretching vibration as well as 1550 and 1432 $cm^{-1}$ from typical bidentate acetate species decreased and the intensity for EDT footprints (e.g., 2922 $cm^{-1}$ for CH stretching) was enhanced by the EDT treatment indicative of successful modification of the surface of CdS with EDT. Ni modification led to decrease in intensity of the EDT footprints, which is indicative of the successful decoration of Ni species utilizing EDT functional groups. The results from elemental analyses for C/H/N show that the presence of the carbon was detected at low quantity, consistent with the FTIR results. The foregoing results indicate the successful tethering of the photocatalyst surface with nickel ions (or other metal ions) by EDT (the linker).

Photocatalytic measurements were carried out in 0.5 M $Na_2S$ 0.5 M $Na_2SO_3$ using the samples prepared in different EDT content (step 1 in FIG. 1) followed by immersing in nickel solution (step 2 in FIG. 2). For the samples treated with low quantity of EDT in step 1 (e.g., adding up to 0.01 ml of 1% EDT solution), the photocatalytic performance monotonically increased, indicating that the EDT amount was not saturated on the CdS surface. Applicant discovered that adding more EDT in the solution (e.g., >0.01 ml) did not improve further the photocatalytic performance, but gave similar rates. This result is consistent with the irreversible and reproducible nature of the EDT adsorption on the CdS particulates, giving subsequently the similar amount of nickel deposition on the surface. Neither direct immersion of CdS into the Ni solution without EDT treatment nor EDT treatment only without Ni immobilization gave high rate of hydrogen evolution. Based on the foregoing, EDT was essential for nickel immobilization, as well as the presence of nickel was essential for high performance of the photocatalysis. In other words, the performance of both steps (steps 1 and 2) shown in FIG. 1 provides improved results and enhances the performance of the photocatalyst.

FIG. 2 shows the diffuse reflectance UV-Vis spectrum of various species including: (1) bare CdS which shows a characteristic absorption edge of the CdS at 550 nm; (2) CdS-EDT-Ni (with surface modification with nickel-EDT species, this absorption edge was not affected by the presence of the nickel-EDT species); and (3) EDT-Ni polymer with CdS (without filtering of the sample from EDT solution and adding directly the Ni source, a nickel-EDT polymer was formed and this in turn gave additional absorption up to 1000 nm beyond the absorption edge of CdS at 550 nm, giving the visual green color of the powder. However, Applicant discovered that using this nickel-EDT polymer as a photocatalyst material did not result in the generation of hydrogen (i.e., no hydrogen evolution was detected). As a result, this polymer is not a good candidate, in and of itself, for use as a photocatalyst in the conversion of $H_2S$ into hydrogen and sulfur.

The quantum efficiency (QE) results are also shown in FIG. 2. The results show relatively high QE with accordance with the absorption edge (~540 nm), consistent with the band gap excitation of CdS as the source of the hydrogen evolution. The QE was found out to be high (>10%) in visible range, with the maximum of 19.4% at 460 nm.

In a separate experiment, a sample was decorated with 1 wt % Pd prepared by a conventional impregnation method and this sample has a higher QE of 36% at 460 nm and the nickel-EDT amount required was much smaller. Based on the foregoing, this material may provide a suitable photocatalyst material for use in certain applications.

Applicant has thus discovered that 1,2-ethanedithiol (EDT) functions as an excellent molecular linker to attach nickel complex (or the like) to cadmium sulfide surface. The $Ni(EDT)_2$ formation constant is very high ($10^{25}$) and this permits the EDT to function as an excellent molecular linker in the present application. The surface modification through this molecular approach is highly reproducible because the amount of the Ni modifier is essentially determined by the amount of EDT deposited on the CdS surfaces. Even though the amount of the nickel immobilized on the surface was very small (e.g., ~0.1 wt %), the highly stable hydrogen evolution ($TON_{Ni}$>8000) was achieved at high rates from sulfur-containing aqueous solution, reaching ~20% quantum efficiency (QE) in a visible range.

EXAMPLE

A photocatalyst material of the present invention is hereinafter described further in detail by way of the follow example(s). However, the present invention is not limited to the following example(s).

Example 1

1,2-ethanedithiol (EDT) and nickel(II) nitrate hexahydrate ($Ni(NO_3)_2.6H_2O$, ≥98.5%) were purchased from Sigma-Aldrich. The disodium sulfide nonahydrate ($Na_2S.9H_2O$, ≥98%) and cadmium (II) diacetate dehydrate (Cd(OAc)$_2$.9H$_2$O, ≥98%) were purchased from Acros Organics. All chemicals were used without further purification. The synthesis of CdS nanocrystals involved mixing together 400 ml of Na$_2$S (0.14 M) aqueous solution with 500 ml of Cd(OAc)$_2$ (0.14 M) aqueous solution and the mixing occurred under vigorous stirring. After continuous stirring for approximately 24 hours, the solution was filtered and the solid was washed with deionized water. This washing step was repeated several times. The resulting yellow solid was then dispersed in 100 ml deionized water and transferred into a Teflon-lined stainless autoclave for hydrothermal processing. After being heated at 453 K for 3 days, the yellow solid was filtered again and kept under vacuum till dry. The resulting structure was a CdS substrate.

After sonicating a solution of CdS (100 mg) in toluene (50 mL, >99.9% Sigma-Aldrich) at room temperature, various volumes of 1% (v/v) EDT solution in ethanol (absolute grade, Sigma-Aldrich) was added to the CdS solution. The resulting mixture was stirred for about 6 hours and then centrifuged. The precipitates were washed with ethanol (20 mL) 3 times, and then re-dispersed in ethanol (40 mL). To the suspension, 5 M Ni(NO$_3$)$_2$ in ethanol (10 mL) was added and stirred for about 1 hour and then centrifuged. The resulting precipitates were washed with ethanol (20 mL) 3 times, centrifuged, and dried under vacuum at 50° C. resulting in a greenish yellow solid with quantitative yield being formed.

A photocatalytic test (described herein) was carried out using a recirculating batch reactor unit and top-irradiated type photocatalytic reactor. The accumulated gaseous products were analysed by using a Bruker-450 gas chromatograph equipped with a TCD and a Molecular Sieve 5 A column. The light source used was an Asahi Spectra MAX-303 (300 W Xe lamp) with a cold mirror and various band pass filters. The photon irradiance was measured using EKO LS-100 spectroradiometer and the photon distributions are shown in supporting information. Typically 50 mg of photocatalyst was immersed well by sonication in 25 ml of 0.5 M Na$_2$S, 0.5 M Na$_2$SO$_3$ (Alfa Aeser, 98%). The reactor was set to the recirculating system and the dissolved air in the solution was evacuated before the photocatalytic test.

The synthesized samples were characterized by inductively coupled plasma optical emission spectrometer (ICP-OES), elemental analysis (C, H, N), X-ray diffraction (XRD), UV-Vis absorption spectra, cyclic voltammetry (CV), X-ray photoelectron spectroscopy (XPS), transmission electron microscopy (TEM) and diffuse reflectance infrared Fourier transform spectra (DRIFTS).

The amounts of Ni, Cd and S were measured by ICP-OES on Varian 720-ES. Elemental analysis was carried out using a Flash 2000 Thermo Scientific CHNS/O analyser. The XRD patterns of the products were collected on a Bruker DMAX 2500 X-ray diffractometer using Cu Kα radiation (λ=0.154 nm). UV-Vis spectra were collected on JASCO V-670 spectrophotometer equipped with an integrating sphere. CV measurements were performed with a Bio-Logic VMP3 electrochemical station using a three-electrode system with an Au disk working electrode (3 mm) for RRDE-3 (ALS Co., Ltd.), carbon paper counter electrode (Toray TGP-H-60), and Ag/AgCl (KCl saturated) reference electrode. The measurements were conducted at a rotating speed of 1600 rpm under Ar atmosphere, in 0.5 M Na$_2$SO$_4$ (≥99.99%, Sigma-Aldrich) with pH of 13, adjusted by NaOH (99.99%, Sigma-Aldrich). The XPS spectra were obtained from AMICUS KRATOS using Mg/Al anodes at 12 kV and 10 mA. TITAN ST transmission electron microscope operated at 300 kV was utilized to characterize the morphology and particle size distribution. The DRIFTS measurements were conducted on Thermal Scientific Nicolet 6700 under flowing nitrogen. The samples were pre-heated at 120-200° C. in attempt to remove adsorbed water, but the spectra did not change by this treatment.

INDUSTRIAL APPLICABILITY

It will be understood from the above disclosure that the photocatalyst of the present invention has high catalytic activity, is nontoxic, can utilize visible light as it is for photocatalytic reactions, and is useful for hydrogen generation, etc.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A process for producing a photocatalyst that is capable of converting H$_2$S into hydrogen and sulfur comprising the steps of:
   preparing a photocatalyst material comprising CdS; and
   using an organic ligand to attach a transition metal species to a surface of the photocatalyst material without the formation of a dopant layer.

2. The process of claim 1, wherein the organic ligand comprises 1,2-ethanedithiol (EDT).

3. The process of claim 1, wherein the transition metal comprises Ni$^{2+}$.

4. The process of claim 1, wherein the transition metal species comprises a late transition metal species.

5. The process of claim 1, wherein the step of using the organic ligand to attach the transition metal species comprises the steps of:
   adding 1,2-ethanedithiol (EDT) to a first solution containing the CdS photocatalyst material to form a first mixture;
   forming CdS precipitates from the first mixture;
   redispersing the CdS precipitates in a second solution to form a suspension;
   adding Ni(NO$_3$)$_2$ to the suspension; and
   forming a CdS photocatalyst material that has Ni-EDT species attached to a surface thereof.

6. The process of claim 5, wherein the first and second solutions comprise ethanol.

7. A photocatalyst made in accordance with the process of claim 1.

8. A process for producing a photocatalyst that is capable of converting H$_2$S into hydrogen and sulfur comprising the steps of:
   providing a photocatalyst material; and
   decorating the surface of the photocatalyst with a transition metal species using an organic ligand without the formation of a dopant layer, wherein the organic ligand comprises 1,2-ethaneodithiol (EDT) and wherein the step of decorating the surface comprises:
   adding the organic ligand to a first solution containing the photocatalyst material to form a first mixture having precipitates;
   washing the first mixture with ethanol;

redispersing the precipitates in a second solution to form a suspension;

adding the transition metal species to the suspension; and washing the suspension with ethanol to form a photocatalyst material having a transition metal-organic ligand species attached to a surface thereof.

9. The process of claim 8, wherein the transition metal species comprises a late transition metal species.

10. The process of claim 8, wherein the photocatalyst material comprises CdS and the transition metal species comprises $Ni^{2+}$.

11. The process of claim 10, wherein the first and second solutions comprise ethanol.

12. The process of claim 10, wherein the transition metal-organic ligand species is a Ni-EDT species.

13. A photocatalyst made in accordance with the process of claim 8.

14. A process for producing a photocatalyst that is capable of converting $H_2S$ into hydrogen and sulfur comprising the steps of:

preparing a photocatalyst material; and using an organic ligand to attach a transition metal species to a surface of the photocatalyst material without the formation of a dopant layer, wherein the organic ligand comprises 1,2-ethanedithiol (EDT).

* * * * *